(12) United States Patent
Hwang et al.

(10) Patent No.: US 9,786,880 B2
(45) Date of Patent: Oct. 10, 2017

(54) CELL MODULE ASSEMBLY

(71) Applicant: LG ELECTRONICS INC., Seoul (KR)

(72) Inventors: Jaecheol Hwang, Seoul (KR); Yongseon Jo, Seoul (KR); Seokmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/523,387

(22) Filed: Oct. 24, 2014

(65) Prior Publication Data

US 2015/0147622 A1  May 28, 2015

(30) Foreign Application Priority Data

Oct. 24, 2013  (KR) ........................ 10-2013-0127369

(51) Int. Cl.

| | |
|---|---|
| *H01M 10/654* | (2014.01) |
| *H01M 10/613* | (2014.01) |
| *H01M 10/625* | (2014.01) |
| *H01M 10/6567* | (2014.01) |
| *H01M 2/10* | (2006.01) |
| *H01M 10/6551* | (2014.01) |
| *H01M 10/6555* | (2014.01) |

(Continued)

(52) U.S. Cl.
CPC ..... *H01M 2/1077* (2013.01); *H01M 10/5004* (2013.01); *H01M 10/5016* (2013.01); *H01M 10/5042* (2013.01); *H01M 10/5075* (2013.01); *H01M 10/613* (2015.04); *H01M 10/6551* (2015.04); *H01M 10/6555* (2015.04); *H01M 10/625* (2015.04); *H01M 10/647* (2015.04); *H01M 10/6562* (2015.04); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 8,163,420 B2 | 4/2012 | Okada et al. | 429/148 |
| 8,227,106 B2 | 7/2012 | Lee et al. | 429/149 |
| 8,435,666 B2 | 5/2013 | Lee et al. | 429/120 |

(Continued)

FOREIGN PATENT DOCUMENTS

| | | |
|---|---|---|
| CN | 102376993 | 3/2012 |
| CN | 102428601 | 4/2012 |

(Continued)

OTHER PUBLICATIONS

Korean Notice of Allowance dated Jul. 31, 2015.

(Continued)

*Primary Examiner* — Ula C Ruddock
*Assistant Examiner* — Osei Amponsah
(74) *Attorney, Agent, or Firm* — KED & Associates, LLP

(57) ABSTRACT

A cell module assembly is provided. The cell module assembly may include a plurality of cells that generates electrical energy, at least one heat plate interposed between the plurality of cells, to absorb heat from the plurality of cells, the at least one heat plate having a cooling channel defined at both ends thereof, and at least one cartridge to accommodate the plurality of cells and the at least one heat plate, the cooling channel being internally defined in the cartridge.

10 Claims, 11 Drawing Sheets

(51) Int. Cl.
   *H01M 10/647*    (2014.01)
   *H01M 10/6562*   (2014.01)

(56) References Cited

U.S. PATENT DOCUMENTS

| | | | | |
|---|---|---|---|---|
| 2003/0003351 A1* | 1/2003 | Ogata | ............... | H01M 2/0242 |
| | | | | 429/120 |
| 2012/0040223 A1* | 2/2012 | Odumodu | ........... | H01M 2/1077 |
| | | | | 429/120 |
| 2012/0171545 A1* | 7/2012 | Hohenthanner | .... | H01M 2/1061 |
| | | | | 429/120 |
| 2013/0108901 A1 | 5/2013 | Schaefer et al. | | |
| 2014/0308558 A1* | 10/2014 | Merriman | ......... | H01M 10/0481 |
| | | | | 429/120 |

FOREIGN PATENT DOCUMENTS

| | | |
|---|---|---|
| EP | 2 339 664 A1 | 6/2011 |
| EP | 2 355 201 A1 | 8/2011 |
| KR | 10-2010-0081674 | 7/2010 |
| KR | 10-2010-0109872 A | 10/2010 |
| KR | 10-2013-0081027 A | 7/2013 |
| KR | 10-2013-0091506 A | 8/2013 |

OTHER PUBLICATIONS

European Search Report issued in Application No. 14190153.8 dated Jan. 21, 2015.
Korean Office Action dated Dec. 29, 2014, issued in Application No. 10-2013-0127369.
Chinese Office Action dated Jul. 5, 2016 issued in Application No. 201410262298.3 (English translation attached).

\* cited by examiner

CELL MODULE ASSEMBLY

CROSS-REFERENCE TO RELATED APPLICATION(S)

This application claims priority to Korean Patent Application No. 10-2013-0127369 filed in Korea on Oct. 24, 2013, the disclosure of which is incorporated herein by reference.

BACKGROUND

1. Field

A cell module assembly is disclosed herein.

2. Background

One serious problem encountered in vehicles using fossil fuels, such as gasoline or light oil, is air pollution. As a measure to solve such a problem, technology for using re-chargeable secondary cells as a power source for vehicles is receiving attention. Thus, an electric vehicle (EV), which can be driven using only a battery, and a hybrid electric vehicle (HEV), which uses a battery in combination with a conventional combustion engine, have been developed, and are commercially available. For secondary cells as a power source of EVs, or HEVs, nickel metal hydride (Ni-MH) cells are generally used. Recently, use of lithium ion cells has also been attempted.

In order to be used as a power source of EVs, or HEVs, the cells should have high power and large capacity. To this end, a medium or large cell pack having a structure, in which a plurality of small secondary cells (unit cells) is connected in series and/or in parallel, is used. As unit cells, which are used in the medium or large cell pack, are stacked at high density, a prismatic cell or a pouch type cell, which is capable of reducing a size of dead space, is used as such a unit cell.

In order to achieve easy mechanical fastening and easy electrical connection of unit cells as discussed above, a cell cartridge capable of mounting one unit cell or two or more unit cells is generally used. That is, a plurality of cell cartridges, in which unit cells are mounted, is stacked to form a cell pack.

For a medium or large cell pack formed by stacking a plurality of cell cartridges, there are various cell cartridge stacking or connection methods. Such methods require many components and a number of processing tasks.

However, such a cell pack generates heat during a dissipation operation. Due to the generated heat, the lifespan and efficiency of the cell pack may be reduced. Therefore, it is necessary to provide a device capable of more efficiently dissipating heat from the cell pack.

BRIEF DESCRIPTION OF THE DRAWINGS

Embodiments will be described in detail with reference to the following drawings in which like reference numerals refer to like elements, and wherein.

DETAILED DESCRIPTION

Figure 1:
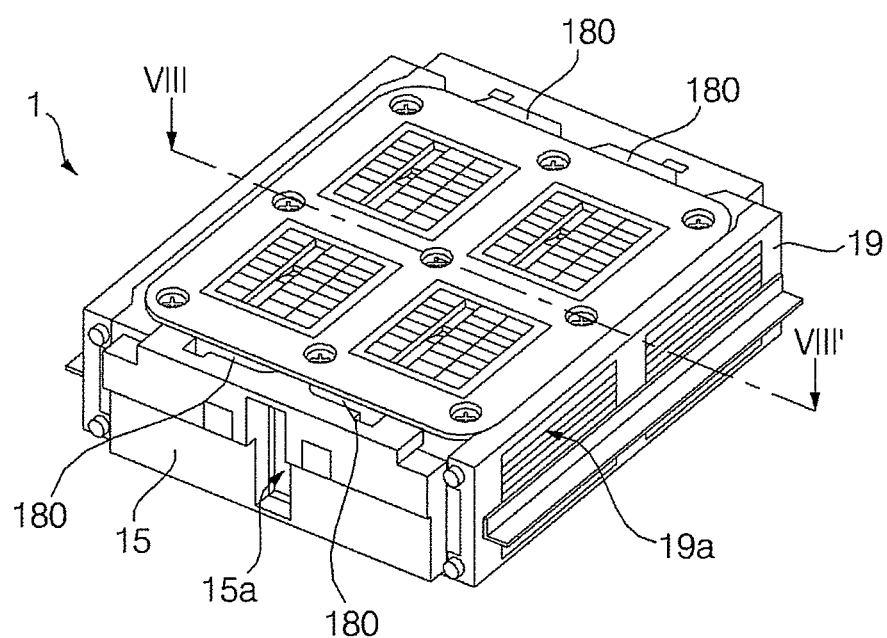
FIG. 1 is a schematic perspective view of a cell module assembly according to an embodiment.

Referring to embodiments described hereinafter in detail with reference to the accompanying drawings, advantages and features and methods for accomplishing the same will be clarified. Embodiments may, however, be embodied in many different forms and should not be construed as limited to the embodiments set forth herein. Rather, these embodiments are provided so that this disclosure will be thorough and complete, and will fully convey the scope to those skilled in the art. Like reference numerals refer to like elements throughout.

Hereinafter, embodiments will be described with reference to the drawings for explaining cell module assemblies according to embodiments.

Figure 2:
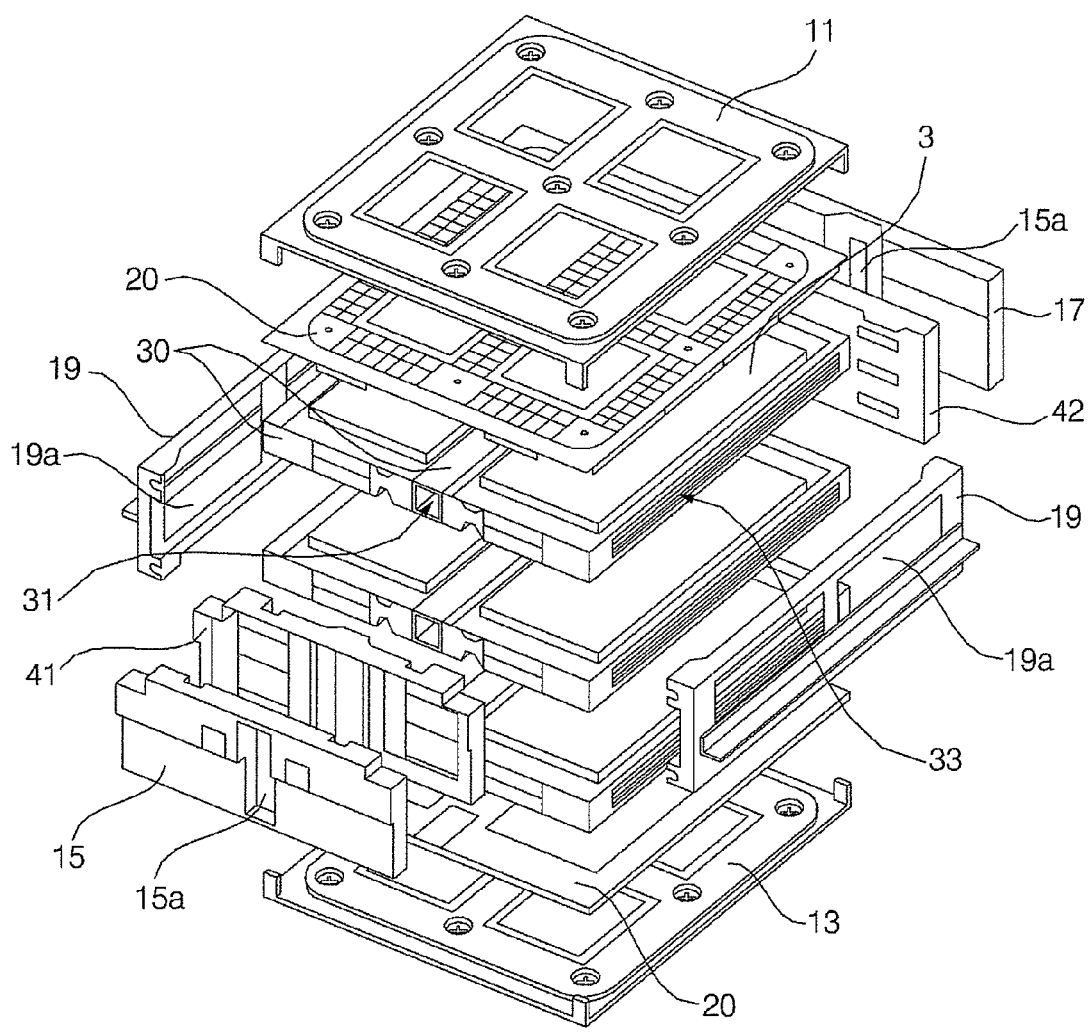
FIG. 2 is an exploded, perspective view of the cell module assembly of FIG. 1.
Figure 3:
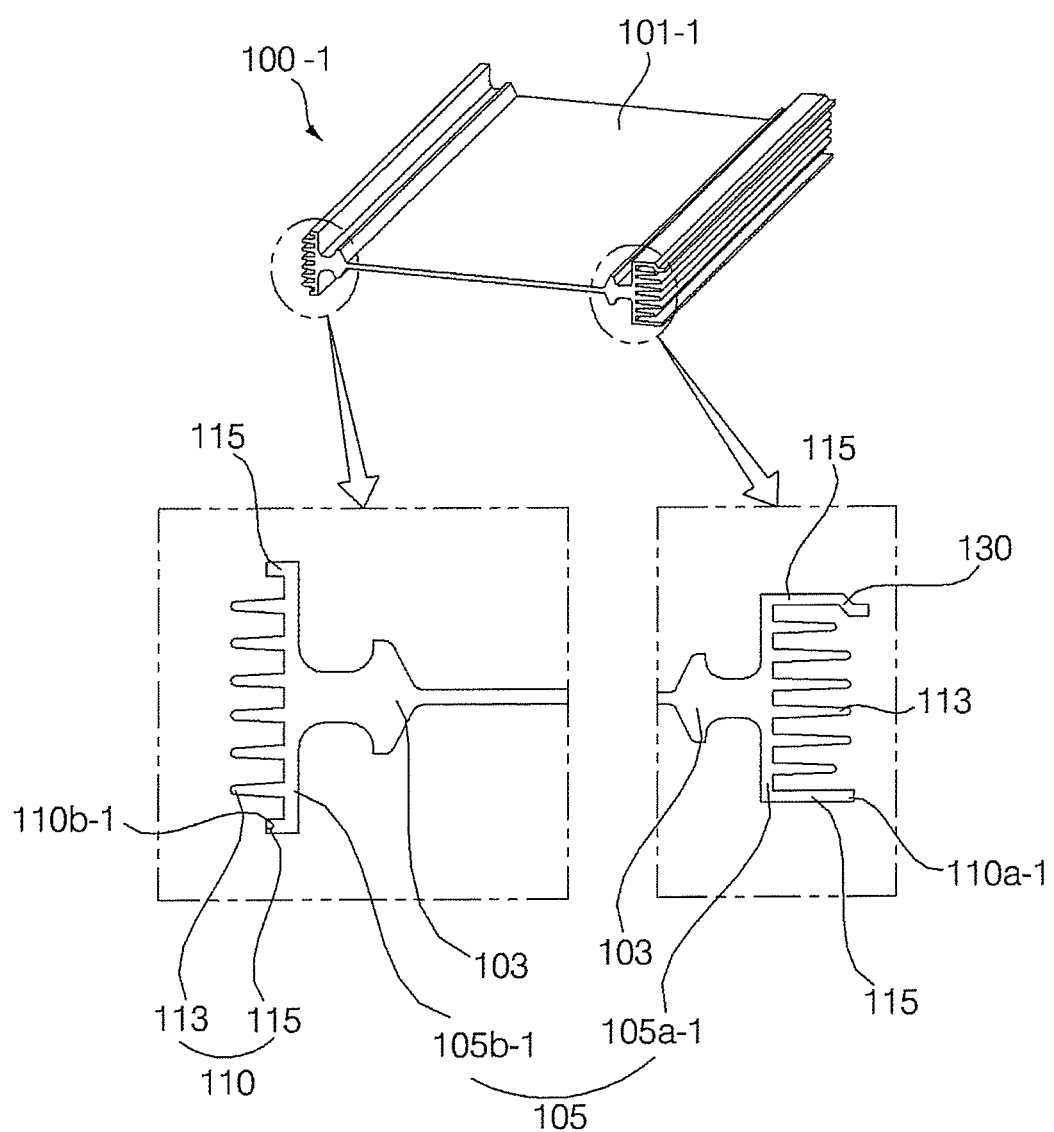
FIG. 3 is a perspective view illustrating a portion of the cell module assembly of FIG. 1.

FIG. 1 is a schematic, perspective view of a cell module assembly 1 according to an embodiment. FIG. 2 is an exploded perspective view of the cell module assembly of FIG. 1. FIG. 3 is a perspective view illustrating a portion of the cell module assembly of FIG. 1.

Referring to FIGS. 1 to 3, cell module assembly 1 according to this embodiment may include a plurality of cells 3 that generate electrical energy, one or more heat plates 100, respectively, that contact the plurality of cells 3, to laterally transfer heat absorbed from the cells 3, for dissipation of heat, and one or more cartridge 30 to accommodate the cells 3 and heat plates 100. A cooling channel 180 may be formed at ends of the heat plates 100. The one or more cartridges 30 may be formed by placing a heat plate 100 in a mold, and then molding the cartridge in the mold by, for example, injection molding. The one or more cartridge 30 may further include cooling channels 160, 170 internally formed therein.

The heat plate 100 may include a plurality of heat plates 100-1 and 100-2, interposed between associated ones of the plurality of cells 3, to absorb heat from the plurality of cells 3. A cooling channel 160, 170 may be formed at each lateral end or along each lateral edge of each heat plate 100-1 and 100-2. The cartridge 30 may accommodate the plurality of cells 3 and the plurality of heat plates 100-1 and 100-2. The cooling channels 160, 170 may be internally defined in the cartridge 30.

The cells 3 generate current and may be lithium ion (Li-ion) cells. The plurality of cells 3 may be horizontally disposed within the cartridge 30. The cells 3 may include a first cell group 3-1, a second cell group 3-2, a third cell group 3-3, and a fourth cell group 3-4, as will be described hereinbelow. The plurality of cells 3 may be connected in series or in parallel. The plurality of cells 3 may be stacked, for example, in a vertical direction or in a lateral direction.

The cartridge 30 may enclose the plurality of cells 3. A plurality of cartridges 30 may be arranged to be vertically stacked. The heat plates 100-1 and 100-2 may be disposed within the cartridge 30. The heat plates 100-1 and 100-2 may contact or form the cooling channels 160, 170. The cooling channels 160, 170 may be passages, through which air introduced from the outside may flow within the cartridge 30. Air flowing through the cooling channels 160, 170 may absorb heat transferred to the cooling channels 160, 170 from the plurality of cells 3. An opening may be formed at the cartridge 30. The opening may include at least one of a side opening and a central opening, as will be described hereinbelow. The opening may form an inlet and/or an outlet for air.

The heat plates 100-1 and 100-2 may include flat plates 101-1 and 101-2, respectively, as will be described hereinbelow. The flat plates 101-1 and 101-2 may be formed to be flat, in order to laterally disperse heat. When cells 3 are arranged over and beneath the flat plate 101-1 and 101-2, the flat plate 101-1 and 101-2 may absorb heat in a vertical direction.

The cell module assembly 1 may include an upper cover 11 disposed at a top or first side, a lower cover 13 disposed at a bottom or second side, a front cover 15 disposed at a front or third side, a rear cover 17 disposed at a rear or fourth side, and side covers 19 respectively disposed at opposite or fifth and sixth sides. One or more heat insulating plate 20 may be provided to prevent transfer of heat.

The heat plates 100-1 and 100-2 may be laterally arranged. In this case, the cooling channels may include a central channel 160 formed between the laterally adjacent heat plates 100-1 and 100-2. The cartridge 30 may be formed with a central opening 31 that communicates with the central channel 160.

The cooling channels may further include outer channels 170 each defined between a connecting member 105 and the cartridge 30, as discussed hereinbelow. The cartridge 30 may be formed with side openings 33 that communicate with the outer channels 170. Each of the side covers 19 may be formed with a side communication hole 19a that communicates with the side opening 33.

As discussed above, the central channel 160 may be formed between laterally adjacent heat plates 100-1 and 100-2 of laterally adjacent cartridges 30. In this case, side openings 33 may be formed at opposite sides of the central opening 31, respectively. The central opening 31 and side openings 33 may be formed in the cartridge 30. The central opening 31 may communicate with the central channel 160 and a central communication hole 15a, as will be described hereinbelow. Each side opening 33 may communicate with a side communication hole 19a, as will be described hereinbelow. The side opening 33 may also communicate with the associated outer channel 170.

In one embodiment, the cell module assembly 1 may further include a front bus bar plate 41 disposed at a front side of the one or more cartridges 30, to electrically connect the plurality of cells 3, a rear bus bar plate 42 disposed at a rear side of the one or more cartridges 30, to electrically connect the plurality of cells 3. The front cover 15 may be disposed at a front side of the front bus bar plate 41, and the rear cover 17 may be disposed at a rear side of the rear bus bar plate 42. A central communication hole 15a that communicates with the central channel 160 may be formed through each of the front bus bar plate 41, the rear bus bar plate 42, the front cover 15, and the rear cover 17.

Air introduced into the central communication hole 15a may be discharged through outlets defined between the front cover 15 and the upper cover 11. Air introduced into the central communication hole 15a may also be discharged through outlets defined between the front cover 15 and the lower cover 13. Air introduced into the central communication hole 15a may also be discharged through outlets defined between the rear cover 17 and the upper cover 11. Air introduced into the central communication hole 15a may also be discharged through outlets defined between the rear cover 17 and the lower cover 13.

The bus bar plates including the front bus bar plate 41 and the rear bus bar plate 42 may electrically connect the plurality of cells 3. The bus bar plates may electrically connect a plurality of cells 3 accommodated in a plurality of cartridges 30. As set forth above, the front cover 15 may be disposed at the front side of the front bus bar plate 41, and the rear cover 17 may be disposed at the rear side of the rear bus bar plate 42. The plurality of cartridges 30 may be disposed at an inside of the front bus bar plate 41.

In accordance with embodiments disclosed herein, the cooling channels may include the outer channel 170, which may be defined between surfaces of each of the heat plates 100-1 and 100-2 and the cartridge 30. The cartridge 30 may be formed with the side opening 33, which may communicate with the outer channel 170.

Outer channels 170 may be formed at each of lateral ends or sides of the cartridge 30, respectively. The outer channels 170 may include first outer channel 170-1 and second outer channel 170-2. The first outer channel 170-1 may be formed between a first outer connecting member 105b-1 and the cartridge 30. The second outer channel 170-2 may be formed between a second outer connecting member 105b-2 and the cartridge 30.

In accordance with embodiments disclosed herein, the cell module assembly 1 may further include the side covers 19 respectively disposed at opposite sides of the one or more cartridges 30. Each side cover 19 may be formed with the side communication hole 19a, which may communicate with the side opening 33. The side opening 33 and side communication hole 19a may be selectively formed. For example, in a low temperature area, the side opening 33 and/or the side communication hole 19a may be closed in order to suppress excessive cooling. The side communication hole 19a may be formed through the side cover 19. The side cover 19 may be fastened, at front and rear ends thereof, to the front cover 15 and rear cover 17, respectively.

Figure 4:
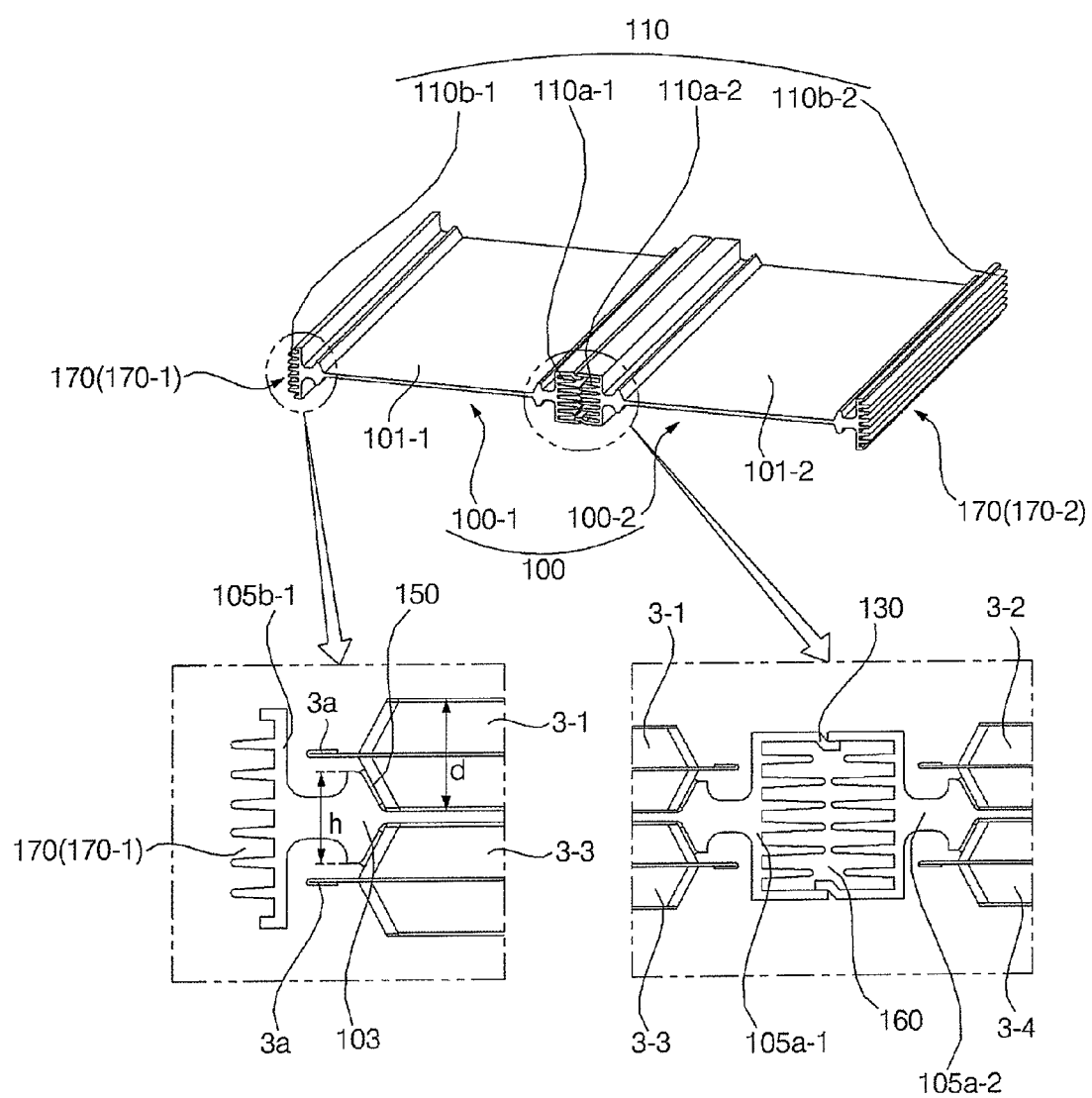
FIG. 4 is a schematic perspective view illustrating structures of heat plates according to embodiments.
Figure 5:
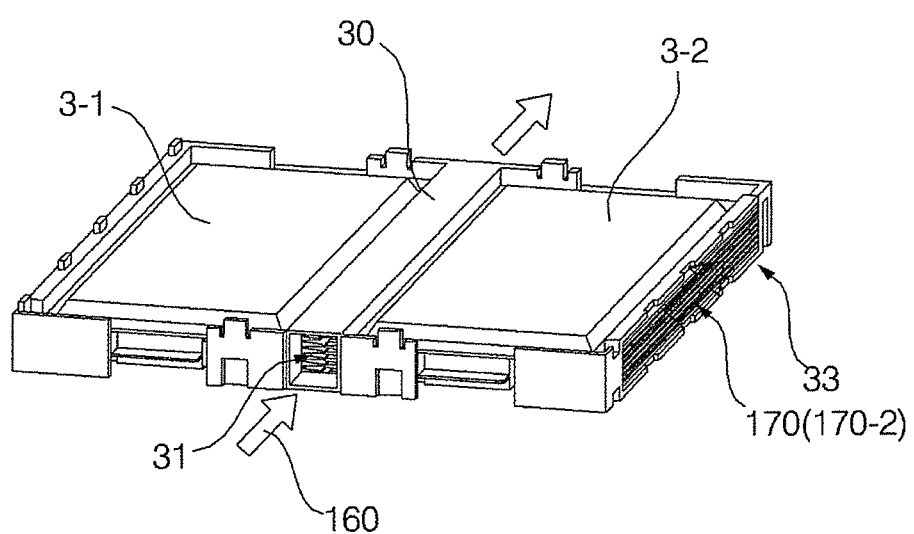
FIG. 5 is a perspective view illustrating the heat plates according to the embodiment of FIG. 4.

FIG. 4 is a schematic perspective view illustrating structures of heat plates according to embodiments. FIG. 5 is a perspective view illustrating the heat plates according to the embodiment of FIG. 4.

Referring to FIGS. 4 and 5, in accordance with embodiments disclosed herein, the plurality of cells 3 may include first cell group 3-1, and second cell group 3-2 disposed substantially in parallel with the first cell group 3-1. The heat plates 100 may include first heat plate 100-1 that absorbs heat from the first cell group 3-1, and second heat plate 100-2 disposed substantially in parallel with the first heat plate 100-1, to absorb heat from the second cell group 3-2. The central channel 160 may be formed between the first and second heat plates 100-1 and 100-2.

The second cell group 3-2 may be disposed substantially in parallel with the first cell group 3-1. In this case, the heat plates 100-1 and 100-2 may include the first heat plate 100-1, which absorbs heat from the first cell group 3-1, and the second heat plate 100-2 disposed substantially in parallel with the first heat plate 100-1, which absorbs heat from the second cell group 3-2. As indicated above, the cooling channel 160 may be formed between the first and second heat plates 100-1 and 100-2.

As another example, the plurality of cells 3 may include first cell group 3-1, second cell group 3-2, third cell group 3-3, and fourth cell group 3-4. The second cell group 3-2 may be disposed at a side of the first cell group 3-1. The third cell group 3-3 may be disposed over or beneath the first cell group 3-1. The fourth cell group 3-4 may be disposed at a side of the third cell group 3-3. The first cell group 3-1 and the third cell group 3-3 may be diagonally arranged. The first cell group 3-1, the second cell group 3-2, the third cell group 3-3, and the fourth cell group 3-4 may be disposed in one cartridge 30. Further, the first cell group 3-1, the second cell group 3-2, the third cell group 3-3, and the fourth cell group 3-4 may have a central channel 160 in common. The central channel 160 may be formed between the first heat plate 100-1 and the second heat plate 100-2.

In accordance with embodiments disclosed herein, each of the heat plates 100-1 and 100-2 may include a flat plate 101-1 or 101-2 formed to be flat and that contacts the cells 3, to absorb heat from the cells 3, cooling fins 110 that extend in a flow direction of air flowing through the cooling channels 160, 170, and connecting members 105 to transfer heat from the flat plate 101-1 or 101-2 to the cooling fins 110. The cooling fins 110 may be disposed at the connecting members 105. The flat plates 101-1 and 101-2 may each contact at least two of the plurality of cells 3, to absorb heat from the cells 3.

For example, the flat plates 101-1 and 101-2 may be interposed between the first cell group 3-1 and the third cell group 3-3 and between the second cell group 3-2 and the fourth cell group 3-4, respectively. The cooling fins 110 may contact air flowing through the cooling channels 160, 170. The cooling fins 110 may be formed to provide an increased heat exchange area. The cooling fins 110 may extend in a flow direction of air in order to prevent the cooling fins 110 from interfering with the flow of air. Each connecting member 105 may be arranged between an associated one of the flat plates 101-1 and 101-2 and the associated cooling fins 110. Each connecting member 105 may extend, for example, substantially vertically, whereas the cooling fins 110 may extend substantially laterally. A plurality of cooling fins 110 may be arranged at each connecting member 105. Heat transferred to the flat plates 101-1 and 101-2 may be transferred to the connecting members 105 which, in turn, may transfer heat to the plurality of cooling fins 110.

The connecting members 105 may include first connecting members 105a-1 and 105b-1 formed at the first heat plate 100-1, and second connecting members 105a-2 and 105b-2 formed at the second heat plate 100-2. The first connecting members 105a-1 and 105b-1 may include a first central connecting member 105a-1 and a first outer connecting member 105b-1. The second connecting members 105a-2 and 105b-2 may include a second central connecting member 105a-2 and a second outer connecting member 105b-2. The first central connecting member 105a-1 may be formed to face the second connecting member 105a-2. The central channel 160 may be formed between the first central connecting member 105a-1 and the second central connecting member 105a-2.

The cooling fins 110 may include first central cooling fins 110a-1 formed at the first central connecting member 105a-1, and second central cooling fins 110a-2 formed at the second central connecting member 105a-2. The first central cooling fins 110a-1 and second central cooling fins 110a-2 may extend substantially in parallel to edges of the flat plates 101-1 and 101-2. The first central cooling fins 110a-1 and the second central cooling fins 110a-2 may define the central channel 160. The first central cooling fins 110a-1 and the second central cooling fins 110a-2 may be coupled with each other. The first central cooling fins 110a-1 and the second central cooling fins 110a-2 may be separably connected.

The first central cooling fins 110a-1 and the second central cooling fins 110a-2 may be sealed in a direction substantially perpendicular to the air flow direction in order to prevent air flowing through the central channel 160 from leaking. The first central cooling fins 110a-1 and the second central cooling fins 110a-2 may contact at certain regions. When the central channel 160 extends in forward and rearward directions, the central channel 160 may be laterally and vertically sealed.

The first central cooling fins 110a-1 and second central cooling fins 110a-2 may be formed with bent portions 130 at respective contact regions thereof. With these bent portions 130, the first central cooling fins 110a-1 and the second central cooling fins 110a-2 may be forcibly engaged with each other, to be connected.

The first outer connecting member 105b-1 may be formed at the first heat plate 100-1 disposed at an end of the first heat plate 100-1 opposite to the first central connecting member 105a-1. The cooling fins 110 may further include first outer cooling fins 110b-1 formed at the first outer connecting member 105b-1. The first outer connecting member 105b-1 and the first outer cooling fins 110b-1 may form a first outer channel 170-1 that extends substantially in parallel with the central channel 160. Likewise, the second outer connecting member 105b-2 may be formed at the second heat plate 100-2 disposed at an end of the second heat plate 100-2 opposite to the second central connecting member 105b-1. The cooling fins 110 may further include second outer cooling fins 110b-2 formed at the second outer connecting member 105b-2. The second outer connecting member 105b-2 and the second outer cooling fins 100b-2 may form a second outer channel 170-2 that extends substantially in parallel with the central channel 160.

The cooling channels may include the first outer channel 170-1 formed at the end of the first heat plate 100-1, the second outer channel 170-2 formed at the end of the second heat plate 100-2 substantially in parallel with the first outer channel 171, and the central channel 160 formed between the first heat plate 100-1 and the second heat plate 100-2 and located between the first outer channel 170-1 and the second outer channel 170-2.

When the first heat plate 100-1 is arranged at a left or first side, and the second heat plate 100-2 is arranged at a right or second side, the first outer cooling fins 110b-1, the first outer connecting member 105b-1, the first flat plate 101-1, the first central connecting member 105a-1, the first central cooling fins 110a-1, the second central cooling fins 110a-2, the second outer cooling fins 110b-2, the second flat plate 101-2, the second connecting member 105a-2, and the second outer cooling fins 110b-2 may be arranged in this order from the left or first side. The central channel 160 may be formed between the central connecting member 105a-1 and the second central connecting member 105a-2.

As discussed above, the plurality of cells 3 may further include the third cell group 3-3 arranged substantially in parallel with the first cell group 3-1. The third cell group 3-3 may be arranged symmetrically with the first cell group 3-1 with respect to the first flat plate 101-1. The plurality of cells 3 may further include the fourth cell group 3-4 arranged in parallel with the second cell group 3-2. The fourth cell group 3-4 may be arranged symmetrically with the second cell group 3-2 with respect to the second flat plate 101-2. The first cell group 3-1, the second cell group 3-2, the third cell group 3-3, and the fourth cell group 3-4 may be held in a fixed state by one cartridge 30.

Each of the heat plates 100-1 and 100-2 may further include an engagement protrusion 103 arranged between the respective flat plate 101-1 or 101-2 and the associated connecting member 105, to prevent the associated cell or cells 3 from moving with respect to the associated connecting member 105. The engagement protrusion 103 may contact the associated cell or cells 3, and absorb heat from the cell or cells 3.

Each engagement protrusion 103 may have a thickness h smaller than a thickness d of each cell 3. A thermal pad 150 may be disposed in an area where each engagement protrusion 103 contacts the associated cell 3, in order to allow heat from the cell 3 to be transferred to the engagement protrusion 103. The thermal pad 150 may be, for example, a thermal tape having adhesion. The thermal tape may prevent movement of the cell 3 while transferring heat from the cell 3 to the engagement protrusion 103. The engagement protrusion 103, the flat plate 101-1 or 101-2, the cooling fins 110, and the connecting members 105 associated with each heat plate 100-1 or 100-2 may be integrally formed. Each heat plate 100-1 or 100-2 may be formed by, for example, an extrusion method.

Each cell 3 may include bent portions 3a formed by folding ends of a cover that covers the cell 3, and sealing the folded ends. The engagement protrusion 103 may extend above or below the bent portions 3a. When the engagement protrusion 103 is formed to extend above the bent portions 3a, liquid leakage may occur at the cell 3 due to interference of the engagement protrusion 103 with the bent portions 3a. As a result, short circuit may occur. The engagement protrusion 103 may also transfer heat generated from the cell 3 to the associated flat plate 101-1 or 101-2 and connecting member 105.

As discussed above, the engagement protrusion 103 may be formed between the associated connecting member 105 and the associated flat plate 101-1 or 101-2. The engagement protrusion 103 may transfer heat received by the respective flat plate 101-1 or 101-2 to the associated connecting member 105. Further, the engagement protrusion 103 may prevent movement of the cell 3. Forward and rearward movement of the cell 3 may be suppressed by the cartridge 30 and bus bar plates, whereas lateral movement of the cell 3 may be suppressed by the engagement protrusion 103.

The flat plates 101-1 and 101-2 may be formed to be flat and, as such, laterally disperse heat. When cells 3 are arranged over and beneath the flat plates 101-1 and 101-2, the flat plates 101-1 and 101-2 may absorb heat in a vertical direction. Heat absorbed by the flat plates 101-1 and 101-2 may be moved to the connecting members 105 arranged at lateral ends of the flat plates 101-1 and 101-2. The connecting members 105 may contact or form the cooling channels 160, 170. The cooling fins 110 may be provided at the connecting members 105. The cooling fins 110 may increase a heat exchange area. The cooling fins 110 may extend in a lateral direction of the cells 3. Alternatively, the cooling fins 110 may be arranged in a longitudinal direction of the cells 3.

Figure 6A:
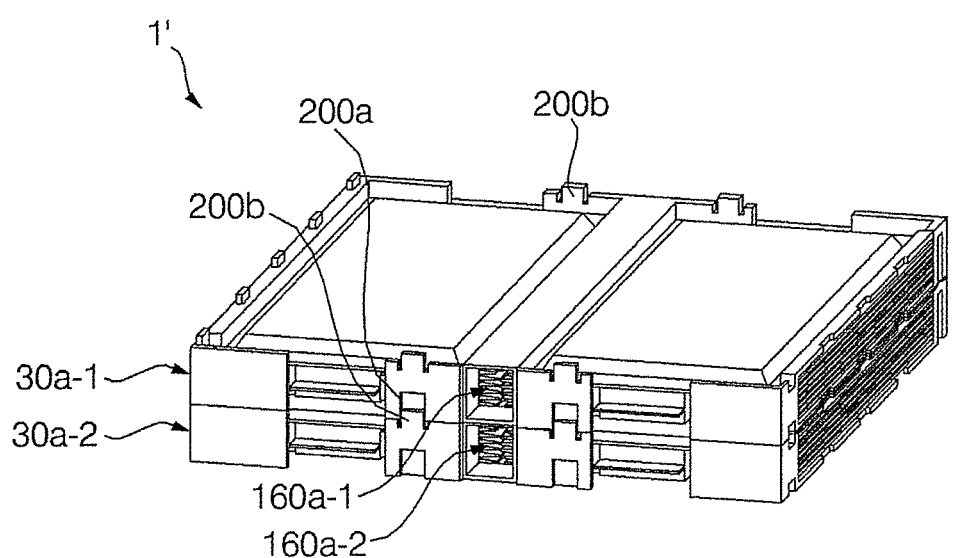
FIGS. 6A-6C are schematic views illustrating various connection types of cartridges according to an embodiment.
Figure 6B:
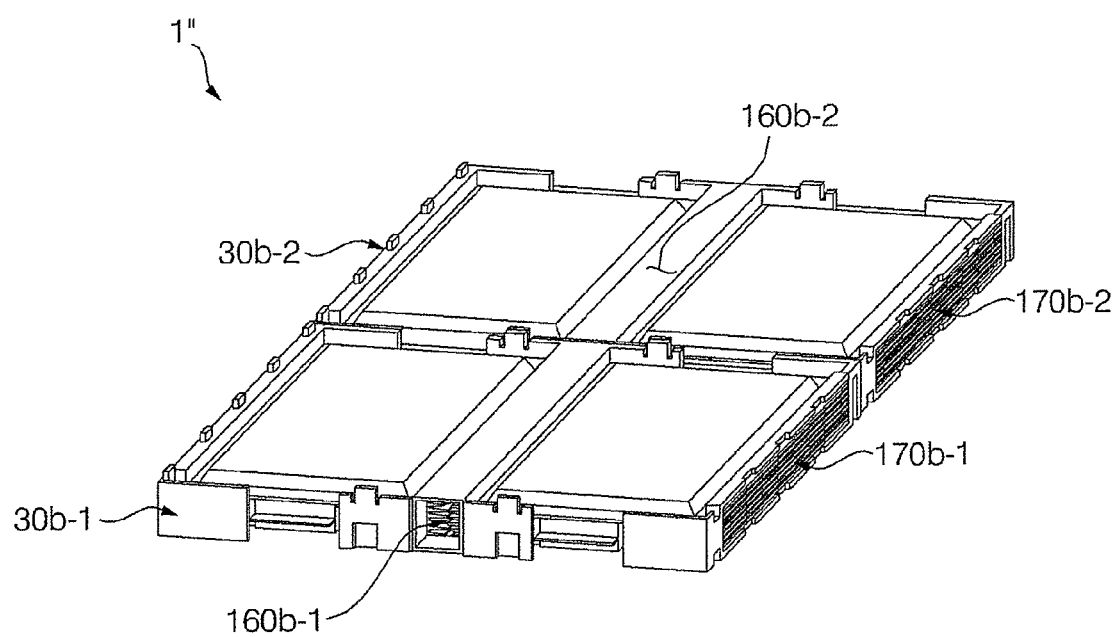
Figure 6C:
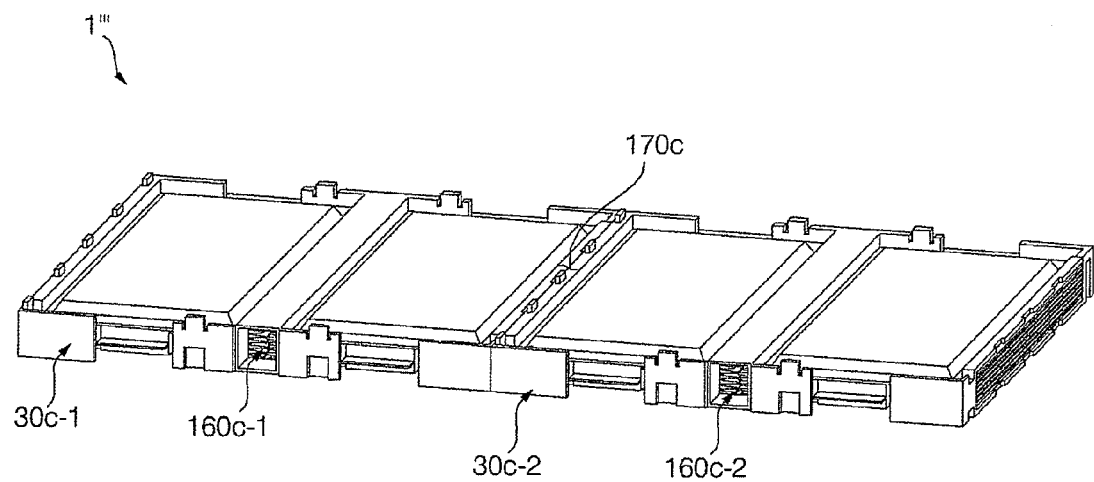

FIGS. 6A-6C are schematic views illustrating various connection types of cartridges according to embodiments. Referring to FIG. 6A, in accordance with one embodiment, the cell module assembly 1' may include a plurality of cartridges 30a-1 and 30a-2. The plurality of cartridges 30a-1 and 30a-2 may be vertically stacked. The cartridges 30a-1 and 30a-2 may be connectable. For example, a groove 200a may be formed at a bottom of each cartridge 30a-1, and a protrusion 200b may be formed at a top of each cartridge 30a-2 and, as such, the cartridges 30a-1 and 30a-2 may be engaged with each other by the groove 200a and protrusion 200b. Central channels 160a-1 and 160a-2 may be formed to be vertically arranged substantially in parallel.

Referring to FIG. 6B, in accordance with another embodiment, the cell module assembly 1" may include a plurality of cartridges 30b-1 and 30b-2 connected in forward and rearward directions or first and second directions. Central channels 160b-1 and 160b-2 of respective cartridges 30b-1 and 30b-2 may communicate with each other. Outer channels 170b-1 and 170b-2 formed at respective cartridges 30b-1 and 30b-2 may be arranged in the forward and rearward directions or first and second directions, and communicate with each other.

Referring to FIG. 6C, in accordance with another embodiment, the cell module assembly 1''' may include a plurality of laterally connected cartridges 30c-1 and 30c-2. Central channels 160c-1 and 160c-2 of respective cartridges 30c-1 and 30c-2 may extend substantially in parallel. The plurality of cartridges 30c-1 and 30c-2 may be laterally connected. Outer channels 170c of adjacent ones of the cartridges 30c-1 and 30c-2 may face each other and communicate with each other. Thus, the central channels 160c-1 and 160c-2 and the outer channels 170c of the plurality of cartridges 30c-1 and 30c-2 may be alternately arranged.

Figure 7A:
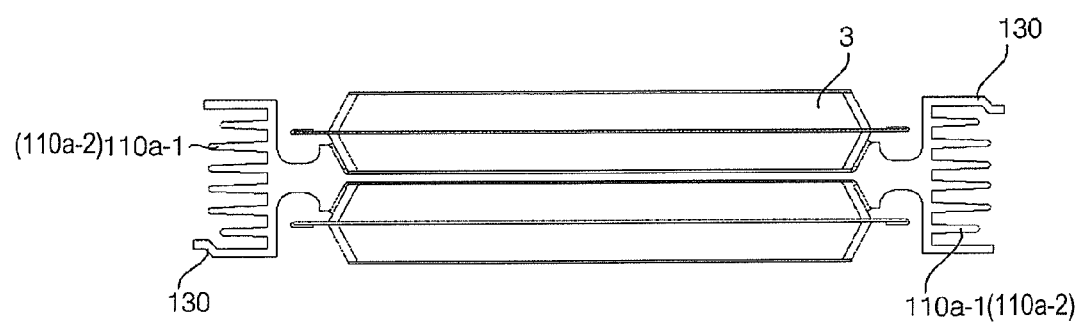
FIGS. 7A-7B are schematic views illustrating various structures of heat plates according to various embodiments.
Figure 7B:
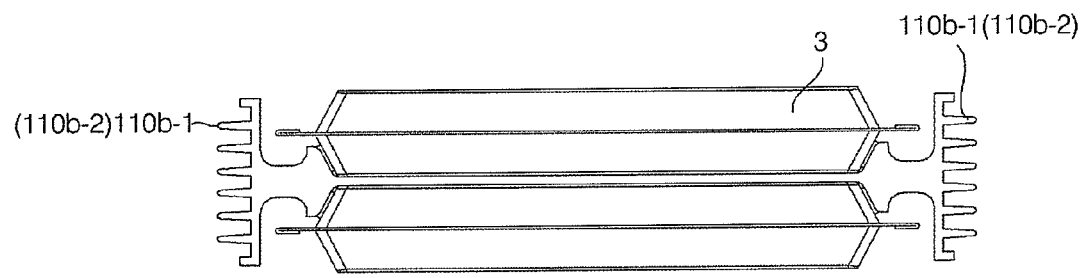

FIGS. 7A-7B are schematic views illustrating various structures of heat plates according to various embodiments. Cooling fins 110 may extend from each of the heat plates 100-1 and 100-2 in at least two directions. As previously discussed, the cooling fins 110 may include central cooling fins 110a-1 or 110a-2, and outer cooling fins 110b-1 or 110b-2. The central cooling fins 110a-1 and 110a-2 may face each other, to form a central channel 160. The outer cooling fins 110b-1 and 110b-2 may face opposite ends of the cartridge 30, to form outer channels 170.

Referring to FIG. 7A, alternatively, central cooling fins 110a-1 and 110a-2 may be arranged at opposite ends of each flat plate 101-1 or 101-2, respectively. In this case, a central channel 160 may be formed at opposite ends of each flat plate 101-1 or 101-2. The central cooling fins 110a-1 and 110a-2 of laterally adjacent ones of the flat plates 101-1 and 101-2 may be separably connected. The central cooling fins 110a-1 and 110a-2 may be separably connected. Separable connection of the central cooling fins 110a-1 and 110a-2 may be achieved by bent portions 130 of the central cooling fins 110a-1 and 110a-2. In this case, theoretically, the heat plates 100-1 and 100-2 may be laterally connected at both ends.

Referring to FIG. 7B, outer cooling fins 110b-1 and 110b-2 may be formed at opposite ends of each flat plate portion 101-1 or 101-2. In this case, outer channels 170 may be formed at opposite ends of each flat plates 101-1 and 101-2, respectively.

Referring again to FIG. 3, the cooling fins 110 may include inner cooling fins 113 and peripheral cooling fins 115. The peripheral cooling fins 115 may be arranged at uppermost and lowermost or outermost end positions, respectively. The inner cooling fins 113 may be arranged between the peripheral cooling fins 115. The inner cooling fins 113 and the outer cooling fins 115 may have different lengths.

The inner cooling fins 113 may have a longer horizontal length than the peripheral cooling fins 115. In accordance with such shapes, air may flow in a vertical direction. When cells 3 are vertically stacked, or a plurality of heat plates 100-1 and 100-2 are vertically stacked, they are not in contact with one another and, as such, enhancement in insulation ability may be achieved.

The outer cooling fins 110b-1 and 110b-2 may have a same length as the central cooling fins 110a-1 and 110a-2. It may be possible to increase a heat exchange area of the cooling fins with air through maximization of the surface area of the cooling fins.

Alternatively, in the case of central cooling fins 110a-1 and 110a-2, inner cooling fins 113 may have a shorter horizontal length than peripheral cooling fins 115. In this case, the central cooling fins 110a-1 and 110a-2 may form a central channel 160 and, as such, it may be possible to obtain a maximum heat exchange area. Through formation of bent portions 130, the peripheral cooling fins 115 may be connected. In the case of the central cooling fins 110a-1 and 110a-2, the outer cooling fins 115 may have different shapes.

Referring again to FIG. 3, the first and second heat plates 100-1 and 100-2 may be symmetrical. The first and second heat plates 100-1 and 100-2 may have the same shape. The central cooling fins 110a-1 and 110a-2 of the first and second heat plates 100-1 and 100-2 may be separably connected.

Figure 8:
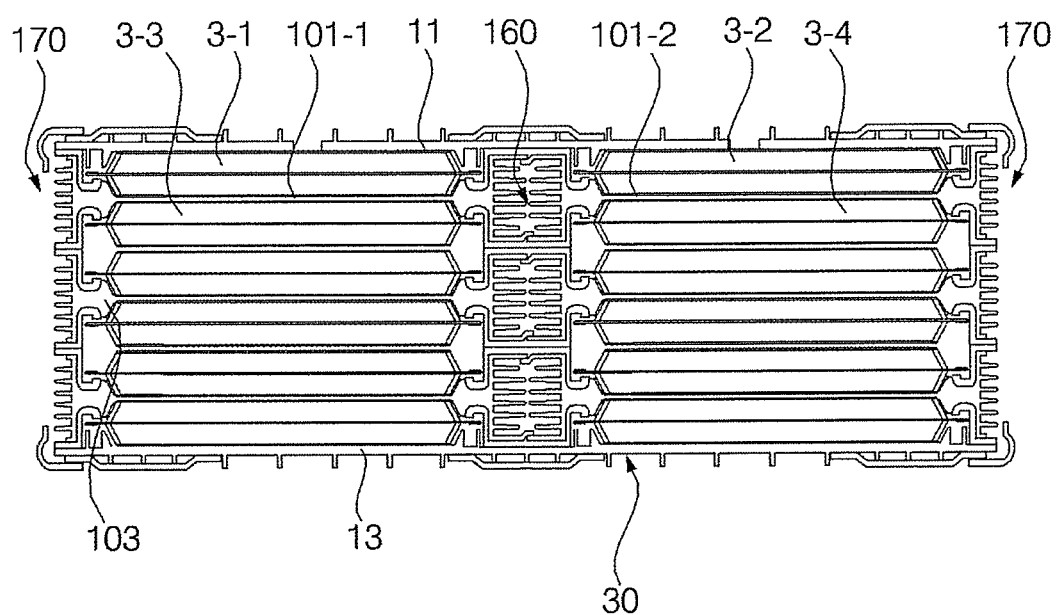
FIG. 8 is a cross-sectional view taken along line VIII-VIII' of FIG. 1.

FIG. 8 is a cross-sectional view taken along line VIII-VIII' of FIG. 1. Referring to FIG. 8, a plurality of cartridges 30 may be stacked. The cell module assembly 1 may include the front cover 15 arranged at the front or third side of the cartridges 30, the rear cover 17 arranged at the rear or fourth side of the cartridges 30, the upper cover 11 arranged at the top or first side of the cartridges 30, and the lower cover 13 arranged at the bottom or second side of the cartridges 30. Each of the front cover 15 and rear cover 17 may be formed with a central communication hole 15a (FIG. 2) that communicates with central channels 160. The front cover 15 and rear cover 17 may be connected with the upper cover 11 and the lower cover 13, to enclose the plurality of cartridges 30. The heat plates 100-1 and 100-2 may be formed separately from the plurality of cartridges 30 and, as such, may be coupled to the plurality of cartridges 30. The heat plates 100-1 and 100-2 may be formed by, for example, extrusion or die casting. Each cartridge 30 may be formed by, for example, disposing heat plates 100-1 and 100-2 in a mold, and then molding the cartridge 30 in the mold.

When the cell module assembly 1 includes a plurality of cartridges 30, the cartridges 30 may be vertically stacked while being laterally connected. The cooling channels 160, 170 of the plurality of cartridges 30 may be arranged substantially in parallel. Each cartridge 30 may be formed with a groove 200a and a protrusion 200b and, as such, adjacent ones of the cartridges 30 may be engaged with each other by the groove 200a and protrusion 200b thereof.

A plurality of cells 3 may be vertically arranged in each cartridge 30. The plurality of cells 3 may be electrically connected by bus bar plates 41 and 42. The plurality of cartridges 30 may be connected to one another. Connection of the cartridges 30 may be achieved by the grooves 200a and protrusions 200b or bolting, for example. The front cover 15, the rear cover 17, the upper cover 11, and the lower cover 13 may hold the plurality of cartridges 30 while enclosing the cartridges 30. The plurality of cartridges 30 may be connected in a flow direction of air flowing through the cooling channels 160, 170 of the cartridges 30. The cooling channels 160, 170 of the cartridges 30 may communicate.

Figure 9:
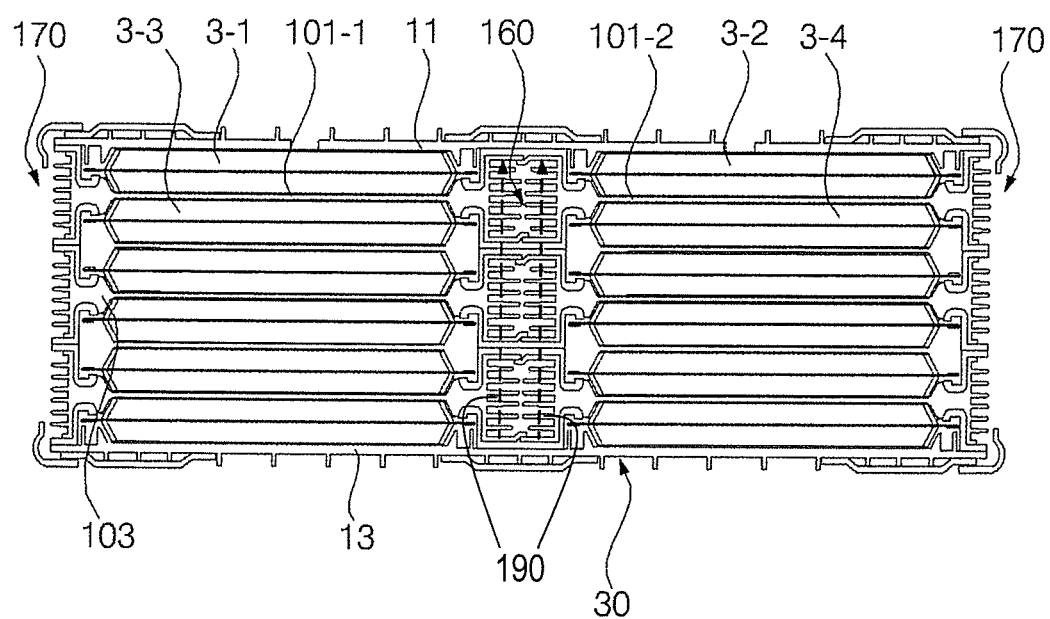
FIG. 9 is a cross-sectional view of a cell module assembly according to another embodiment.

FIG. 9 is a cross-sectional view of a cell module assembly according to another embodiment. Referring to FIG. 9, the cooling channel 180 may further include a vertical channel 190 that vertically communicates with the central channels 160. When the plurality of cartridges 30 are vertically stacked, the vertical channel 190 is vertically formed within the cartridges 30. The vertical channel 190 is perpendicular to the central channels 160. The vertical channel 190 may be perpendicular to the outer channel 170. In this case, the cooling fins 110 has vertical holes which is formed in a vertical direction.

Hereafter, effects of the cell module assembly 1 (1', 1", 1''') according to embodiments disclosed herein will be described.

The heat plates 100-1 and 100-2 may have a structure capable of laterally dispersing heat and, as such, it is possible to reduce a height of the cell module assembly 1. In accordance with such structure, the cell module assembly 1 may be miniaturized and, as such, an interior space of a vehicle, in which the cell module assembly 1 is installed, may be increased. Moreover, it is possible to effectively cool a plurality of cells 3 by a reduced number of cooling channels 160, 170. A size of a central channel 160 may be increased by virtue of the above-described structure and, as such, a smooth flow of air may be obtained. In addition, an increase in heat exchange area may be achieved by virtue of the cooling fins 110 and, as such, an enhancement in cooling efficiency may be achieved.

Embodiments disclosed herein provide a cell module assembly capable of efficiently dissipating heat generated from cells. Further, embodiments disclosed herein provide a cell module assembly capable of achieving a reduction in size, using a plurality of heat plates. Additionally, embodiments disclosed herein provide a cell module assembly in which a plurality of cooling channels is formed within a cartridge.

Embodiments disclosed herein provide a cell module assembly that may include a plurality of cells that generate electrical energy, at least one heat plate interposed between the cells, to absorb heat from the cells, the heat plate being formed, at both ends thereof, with a cooling channel, and at least one cartridge to accommodate the cells and the heat plate, the cooling channel being internally defined in the cartridge.

The plurality of cells may include a first cell group, and a second cell group arranged substantially in parallel with the first cell group. The at least one heat plate may include a first heat plate to absorb heat from the first cell group, and a second heat plate to absorb heat from the second cell group. The cooling channel may be defined between the first heat plate and the second heat plate.

Each of the heat plates may include a flat plate portion that contacts at least two of the plurality of cells, to receive heat from the contacted cells, cooling fins that extends in a flow direction of air flowing through the cooling channel, and a connecting member to transfer heat from the flat plate portion to the cooling fins. A plurality of cooling fins may be arranged at the connecting member.

The connecting members of the heat plates may include a first connecting member formed at the first heat plate, and a second connecting member formed at the second heat plate, to face the first connecting member. The cooling channel may be defined between the first connecting member and the second connecting member.

The cooling fins of the heat plates may include first cooling fins formed at the first connecting member, and second cooling fins formed at the second connecting member. The first cooling fins and the second cooling fins may extend substantially in parallel to an edge of the flat plate portion. The first cooling fins and the second cooling fins may be separably connected.

The cooling channel may include a first outer channel formed at both ends of the first heat plate, a second outer channel formed at both ends of the second heat plate substantially in parallel with the first outer channel, and a central channel formed between the first heat plate and the second heat plate while being defined between the first outer channel and the second outer channel.

Each of the heat plates may further include an engagement protrusion arranged on the heat plates, to prevent at least one of the plurality of cells from moving with respect to the connecting member. The engagement protrusion may contact the at least one cell, to absorb heat from the contacted cell. A thermal pad may be disposed at an area where the engagement protrusion contacts the cell.

Each of the cells may include cell packing portions formed by folding ends of a cell cover to cover the cell, and sealing the folded ends. The engagement protrusion may extend to a lower level than the cell packing portions.

The at least one heat plate may include a plurality of heat plates. In this case, the cooling channel may include central channels each formed between adjacent ones of the heat plates. The cartridge may be formed with a central opening that communicates with the central channels.

The cell module assembly may further include a cover to enclose the cartridge. The cover may be formed with a central communication hole that communicates with the central channel.

The cell module assembly may further include a cover to enclose the cartridge. The cooling channel may include an outer channel defined between the connecting member and the cartridge. The cartridge may be formed with a side opening that communicates with the outer channel. The cover may be formed with a side communication hole that communicates with the side opening.

The at least one cartridge may include a plurality of cartridges. The plural cartridges may be vertically stacked while being laterally connected. The cooling channels respectively defined in the cartridges may extend in parallel. Each of the cartridges may be formed with a groove and a protrusion, for engagement of adjacent ones of the cartridges.

The at least one cartridge may include a plurality of cartridges. The cartridges may be connected in a flow direction of air flowing through the cooling channels respectively defined in the cartridges. The cooling channels respectively defined in the cartridges may communicate with one another.

The first heat plate and the second heat plate may have the same shape.

Although embodiments have been disclosed for illustrative purposes, those skilled in the art will appreciate that various modifications, additions and substitutions are possible, without departing from the scope and spirit as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cell module assembly, comprising:
a plurality of cells that generates electrical energy;
a plurality of heat plates interposed between the plurality of cells to absorb heat from the plurality of cells, each of the plurality of heat plates defining cooling channels along first and second edges of each of the plurality of heat plates; and
at least one cartridge to accommodate the plurality of cells and the plurality of heat plates, wherein the plurality of cells includes a first cell group, and a second cell group arranged in parallel with the first cell group, wherein the plurality of heat plates includes a first heat plate to absorb heat from the first cell group, and a second heat plate to absorb heat from the second cell group, wherein the cooling channels include a central cooling channel defined between the first and second heat plates, and outer cooling channels defined between outer edges of the first and second heat plates and inner walls of the at least one cartridge, wherein each of the first and second heat plates includes:
a flat plate that contacts least two of the plurality of cells to receive heat from the at least two of the plurality of cells;
a plurality of outer cooling fins that extends in a flow direction of air flowing through the outer cooling channel;
a plurality of central cooling fins that extends in a flow direction of air flowing through the central cooling channel;
an outer connecting member provided between the plurality of outer cooling fins and the flat plate to form the outer cooling channel with the at least one cartridge, the outer connecting member transferring heat from the flat plate to the plurality of outer cooling fins, the plurality of outer cooling fins being arranged at the outer connecting member; and
a central connecting member provided between the plurality of central cooling fins and the flat plate to form the central cooling channel, the central connecting members transferring heat from the flat plate to the plurality of central cooling fins, the plurality of central cooling fins being arranged at the central connecting member, wherein the plurality of outer cooling fins includes inner cooling fins and peripheral, cooling fins, wherein the inner cooling fins of the outer cooling fins have a longer horizontal length than the peripheral cooling fins of the outer cooling fins, wherein the plurality of central cooling fins includes inner cooling fins and peripheral cooling fins, wherein the inner cooling fins of the central cooling fins have a shorter horizontal length than the peripheral cooling fins of the central cooling fins, and wherein at least one of the peripheral cooling fins of the central cooling fins has a bent portion, such that the bent portion of the peripheral cooling fins of the central cooling fins of the first heat plate is forcibly engaged to be connected with the peripheral cooling fins of the central cooling fins of the second heat plate, and the bent portion of the peripheral cooling fins of the central cooling fins of the second heat plate is forcibly engaged to be connected with the peripheral cooling fins of the central cooling fins of the first heat plate.

2. The cell module assembly according to claim 1, wherein the first beat plate and the second heat plate have the same shape.

3. The cell module assembly according to claim 1, wherein each of the first and second heat plates further includes an engagement protrusion, to prevent a respective cell of the plurality of cells from moving with respect to each of the outer and central connecting members, the engagement protrusion contacting the respective cell, to absorb heat from the contacted cell.

4. The cell module assembly according to claim 3, wherein a thermal pad is disposed at an area were the engagement protrusion contacts the respective cell.

5. The cell module assembly according to claim 3, wherein each of the plurality of cells includes cell packing portions formed by folding ends of a cover that covers the cell, and sealing the folded ends, and wherein the engagement protrusion extends below the cell packing portions.

6. The cell module assembly according to claim 1, further including at least one covet that encloses the at least one cartridge, wherein the at least one cartridge is formed with a side opening that communicates with the outer cooling channel, and wherein the at least one cover is formed with a side communication hole that communicates with the side opening.

7. The cell module assembly according to claim 1, wherein the at least one cartridge is formed with a central opening that communicates with the central cooling channel.

8. The cell module assembly according to claim 7, further including at least one cover that encloses the at least one cartridge, wherein the at least one cover is formed with a central communication hole that communicates with the central cooling channel.

9. The cell module assembly according to claim 1, wherein the at least one cartridge includes a plurality of cartridges, wherein the plurality of cartridges is vertically stacked while being laterally connected, wherein the cooling channels extend substantially in parallel, and wherein each of the plurality of cartridges is formed with a groove and a protrusion, for engagement of adjacent ones of the plurality of cartridges.

10. The cell module assembly according to claim 1, wherein the at least one cartridge includes a plurality of cartridges, wherein the plurality of cartridges is connected in a flow direction of air flowing through the cooling channels, and wherein the cooling channels communicate.

* * * * *